(12) United States Patent  (10) Patent No.: US 7,090,500 B1
Guttman  (45) Date of Patent: Aug. 15, 2006

(54) EDUCATIONAL GAME WITH DEMONSTRATED TASK ACHIEVEMENT

(76) Inventor: Matthew Guttman, 410 Riverside Dr., Apt. 53A, New York, NY (US) 10025

( * ) Notice: Subject to any disclaimer, the term of this patent is extended or adjusted under 35 U.S.C. 154(b) by 505 days.

(21) Appl. No.: 10/663,543

(22) Filed: Sep. 17, 2003

(51) Int. Cl.
*G09B 19/24* (2006.01)

(52) U.S. Cl. ............... 434/260; 434/247; 434/258; 446/227

(58) Field of Classification Search ............ 434/258, 434/260, 247, 259; 446/227
See application file for complete search history.

(56) References Cited

U.S. PATENT DOCUMENTS

| | | | | |
|---|---|---|---|---|
| 1,474,738 A | * | 11/1923 | Thierjung | 5/498 |
| 2,385,197 A | * | 9/1945 | Eisel | 434/260 |
| 2,461,682 A | * | 2/1949 | De Ferrari | 482/130 |
| 2,677,834 A | * | 5/1954 | Moynihan | 128/872 |
| 2,972,820 A | * | 2/1961 | Cano | 434/260 |
| 3,638,334 A | * | 2/1972 | Malikowski | 434/260 |
| 3,997,982 A | * | 12/1976 | Holland | 434/260 |
| 4,096,647 A | * | 6/1978 | Barry | 434/260 |
| 4,661,072 A | * | 4/1987 | White | 434/260 |
| 4,968,279 A | * | 11/1990 | Smith | 446/71 |
| 5,069,623 A | * | 12/1991 | Peat | 434/260 |
| 5,110,296 A | * | 5/1992 | Cohen | 434/260 |
| 5,551,687 A | * | 9/1996 | Krull | 473/573 |
| 5,639,244 A | * | 6/1997 | Stricklin | 434/260 |
| 6,427,265 B1 | * | 8/2002 | Dix | 5/482 |

* cited by examiner

*Primary Examiner*—Dmitry Suhol
(74) *Attorney, Agent, or Firm*—Myron Amer PC

(57) ABSTRACT

The play of a child's educational game to teach skills, such as color recognition, in which free ends of "color" straps in assigned locations are interconnected to demonstrate the child's comprehension of color recognition, and in which adult intervention between preliminary and subsequent demonstrations consisting of changing of the assigned positions of the straps rules out that the subsequent demonstration is based on remembered positions of the straps rather than on color recognition selection, thereby contributing to the educational value of the game.

1 Claim, 3 Drawing Sheets

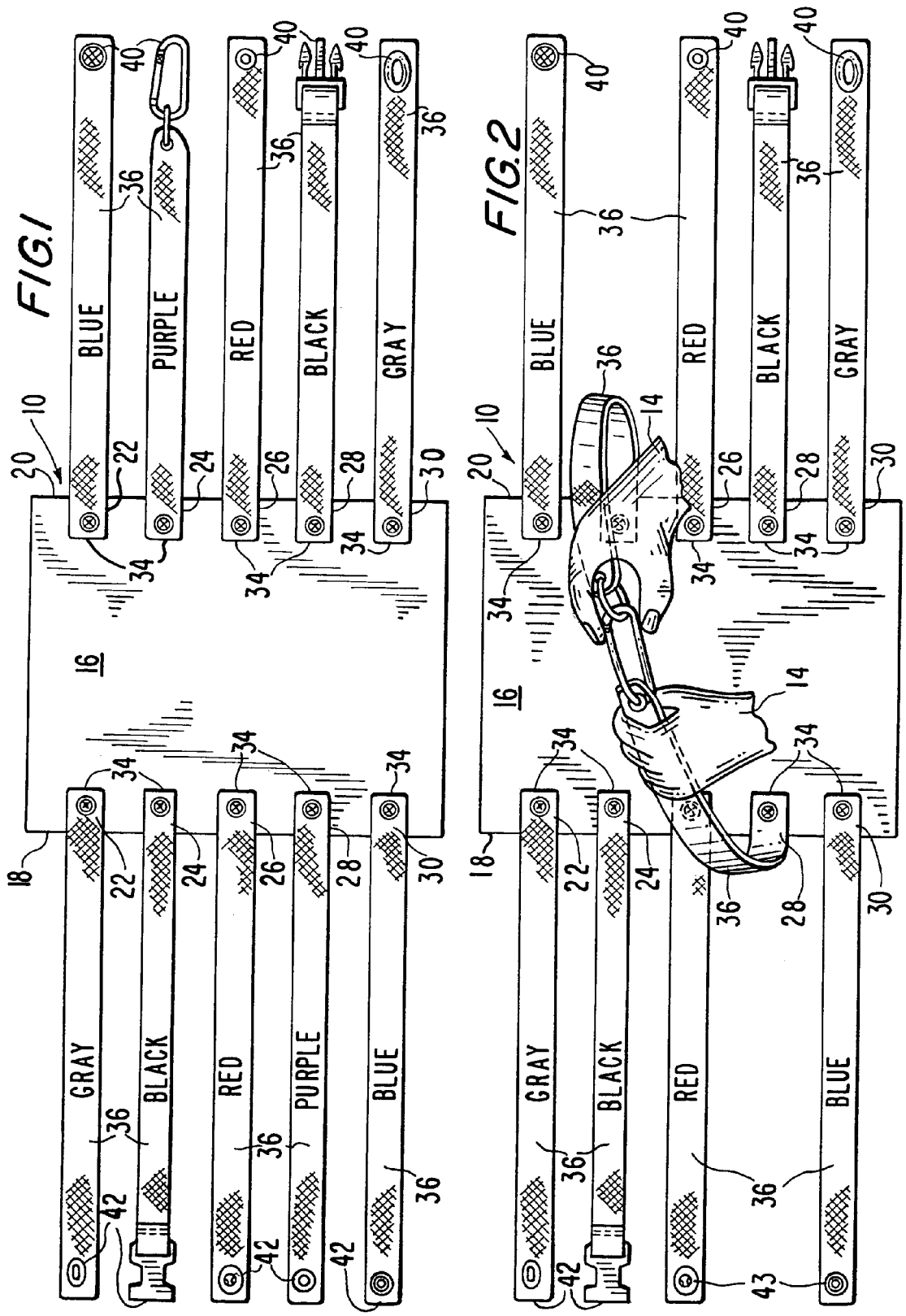

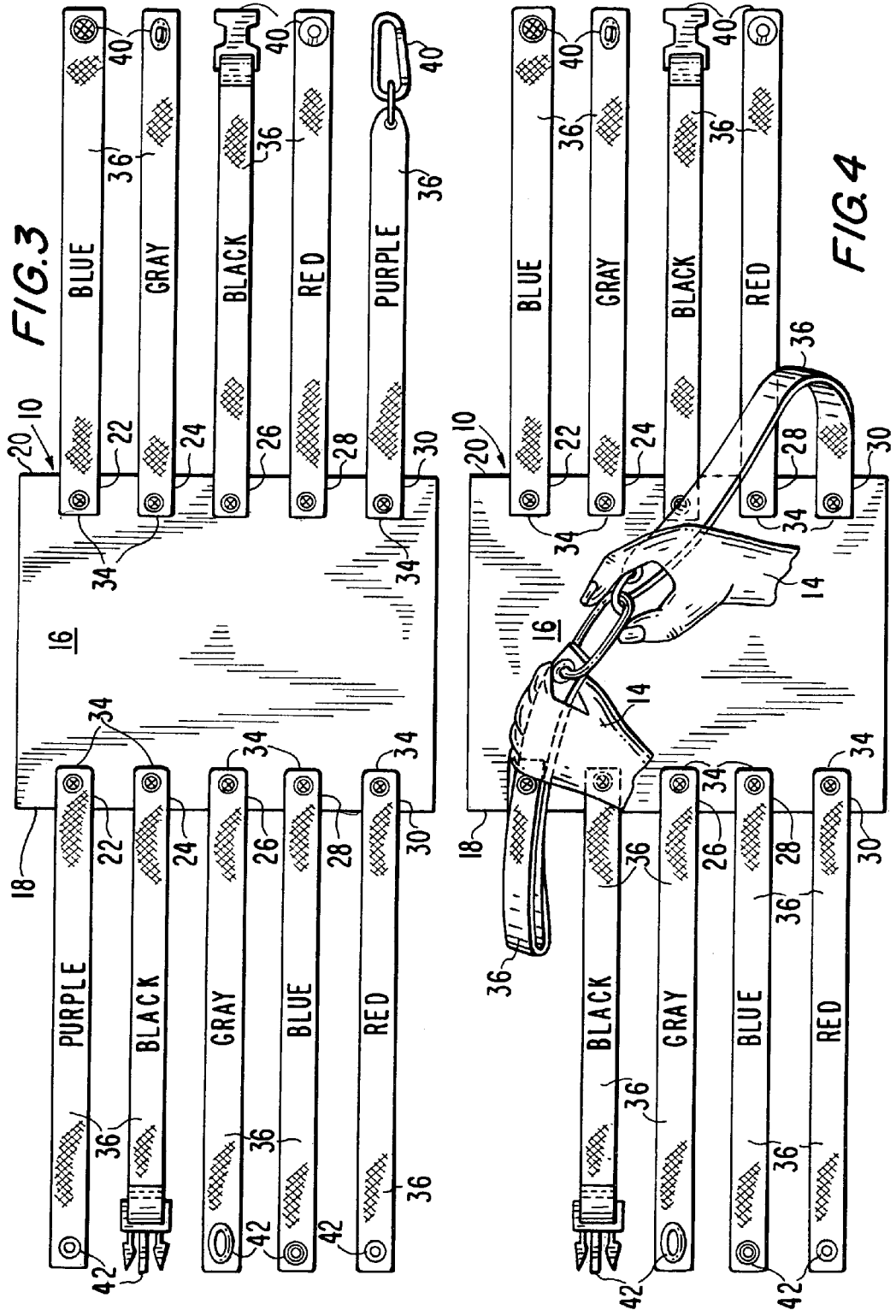

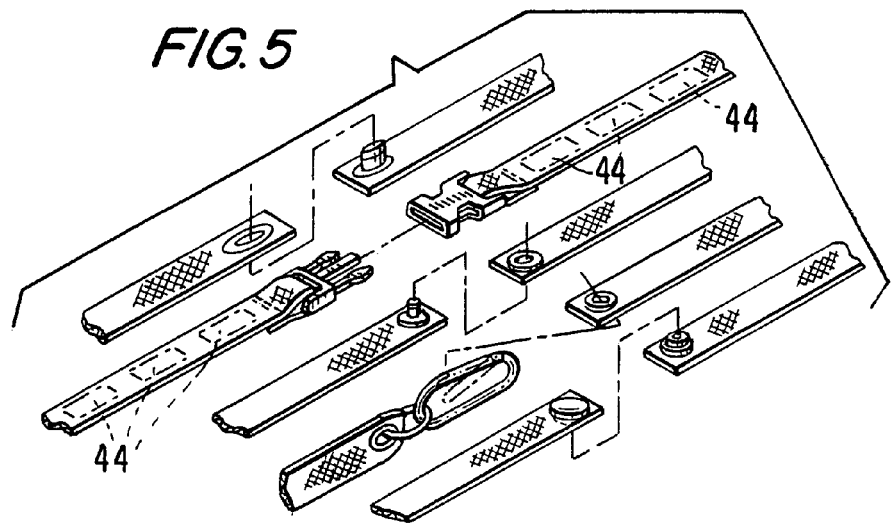
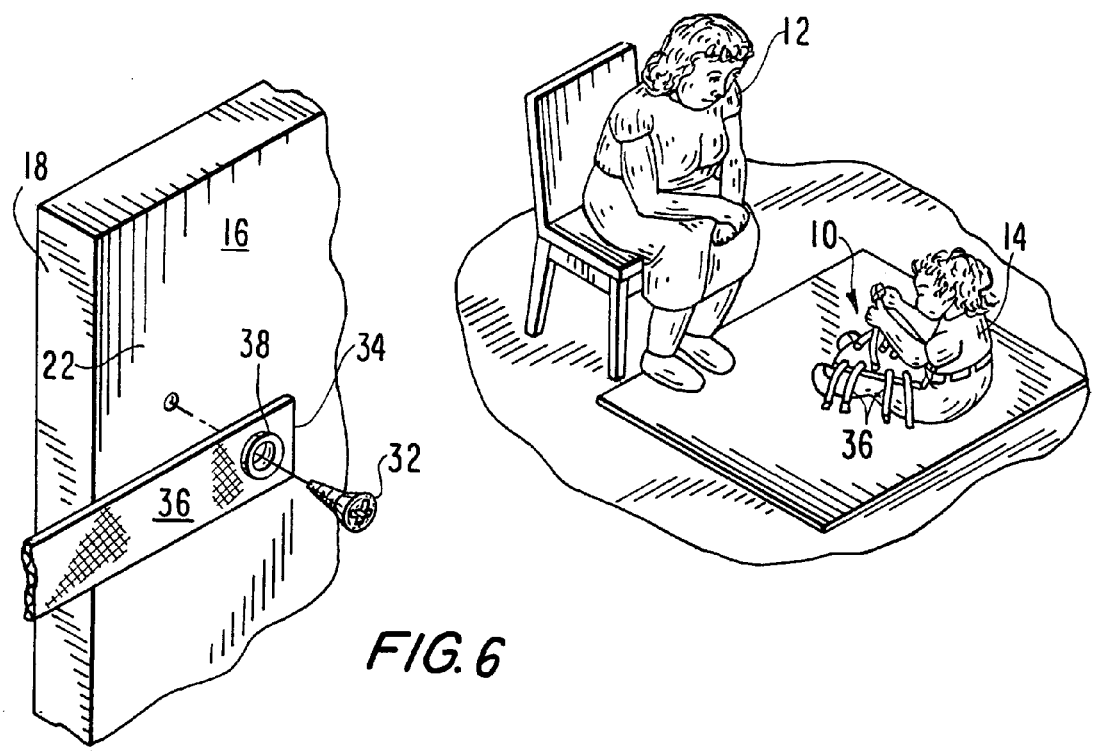

EDUCATIONAL GAME WITH DEMONSTRATED TASK ACHIEVEMENT

The present invention relates generally to improvements in an educational game for a pre-school aged child in which, more particularly, the improvements not only effectively teach a wide range of task achievements to the child, but in the playing of the game this is effectively demonstrated to a supervising adult, all as will be better understood as the description proceeds.

EXAMPLE OF THE PRIOR ART

Exemplary of educational toys or games is U.S. Pat. No. 3,849,912 for "EDUCATIONAL TOY" issued to Ronald Kemnitzer on Nov. 26, 1974, which is instructive because it teaches, as an example, shape recognition, and has the child demonstrate the accomplishment of this task by a physical placement of the recognized shape. As described in the '912 patent, the child will demonstrate the recognition of a triangular shaped playing piece by the placement of the selected playing piece on dowels. If the playing piece(s) is embodied with color, the task of recognizing color, i.e., what the color "purple" looks like, can be demonstrated by the child by placement of the selected "purple" playing piece in its triangular shape, again on the same dowels. What is lacking, however, in the '912 patented toy and its method of play, as well as in all other known educational games, is ruling out that the selection demonstrated is on the basis requested by the adult, i.e., color recognition, and not on any other basis such as the triangular shape or the dowels previously used for the prior demonstration, which may have been used by the child. To this extent, therefore, the educational toy/game does not have the educating end result intended.

Broadly, it is an object of the present invention to overcome the foregoing and other shortcomings of the prior art.

More particularly, it is an object of the present invention to use to advantage adult intervention in the method of play of the game to determine with greater certainty the comprehension of the child, whether it be color recognition, shape recognition, or recognition of other cognitive features.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a front elevational view of a game board component of an educational game in accordance with the present invention;

FIG. 2 is a similar view illustrating use of the game board during play of the educational game;

FIGS. 3 and 4 are views duplicative, respectively, of FIGS. 1 and 2, illustrating use of the game board in a modified condition;

FIG. 5 is a partial perspective view of interconnecting ends of strap components of the educational game;

FIG. 6 is a partial perspective view, on an enlarged scale, of structural details of the game board; and FIG. 7 illustrates, in perspective, the playing of the educational game.

Illustrated in the drawings is a game, generally designated 10, that provides a play value activity for children in conducting multi-task testing, such as matching and thus teaching what constitutes colors, i.e., what the color "purple" looks like as one exemplary task, interconnecting male and female connectors and thus teaching shape recognition and thus what "male" shape is connectable to a "female" shape as another exemplary task, and other tasks limited only to the imagination of the game manufacturer.

Underlying the present invention is the understood communication to a supervising parent or adult 12 of the achievement of the assigned task by the child 14, who may be too young to vocalize the achievement by saying, for example, while pointing to a "purple" object, "this is purple."

An equally formidable impediment to an effective communication from a child 14 to a supervising adult 12 is that of a task achieved on one basis, but not on the basis that was intended to be tested. For example, a child asked to select an object, in this case in the specific form of a strap, of a specified color, may select such a colored strap but not because of a correct recognition of what this color looks like, but because of its physical location in the game materials supplied. As will be better understood as the description proceeds, the playing of the game 10 as generally illustrated in FIG. 7 is designed to provide an understood communication of the achievement of the task on the basis requested, and not on some other basis, thus contributing to the educational value of the game.

Game 10 includes a game board 16 of a preferred rectangular shape having opposite long sides 18 and 20, and along each side at five locations 22, 24, 26, 28 and 30, are appropriately attached by Phillips head screws 32 the ends, individually and collectively designed 34 of one group of five straps, also individually and collectively designated 36, dyed selected colors labeled as illustrated, "gray," "black," "red," "purple" and "blue," so that in the first group, the gray strap 36 is at the attachment site 22, the black strap 36 at the attachment site 24, the red strap 36 at the attachment site 26, the purple strap 36 at the attachment site 28, and the blue strap 36 at the attachment site 30.

A second group of straps 36 is similarly attached as just described for the first group but to the opposite side 20 of the game board 16 and at different locations or attachment sites for the same colors, so that in the second group the blue strap 36 is at the attachment site 22, the purple strap 36 is at the attachment site 24, the red strap 36 is at the attachment site 26, the black strap 36 is at the attachment site 28, and the gray strap 36 is at the attachment site 30.

In accordance with the present invention, the supervising adult 12 at least by either voice explanation or actual demonstration, or both, communicates to the child 14 that the straps 36 connect to each other, providing this communication for each of the cooperating pairs of straps 36 and, in the process, teaches shape recognition of the connectors, soon to be described, at the free end of the straps 36. It is to be noted that the adult 12 is instructed to appropriately communicate approval to the child when strap ends are successfully connected, either vocally, by clapping, or otherwise. In practice, the connecting of the straps 36 has been readily noted as having play value for the child, wherein the child 14 often requests the playing of the game 10, and by trial and error learns what connectors connect to each other.

Having established the communication by the child 14 to the adult 12 of successful interconnection of the strap ends, the supervising adult 12 for the next task then instructs the child 14 to identify the color "purple" as a first color recognition to be taught, either vocally, by demonstration, or both, again providing approval when the two "purple" straps 36 are correctly interconnected. This is the procedure followed for each of the straps of the color involved, and is repeated to the satisfaction of the adult 12 that the child 14 has learned and can successfully perform the task of color recognition, i.e., that the child knows what the color "purple" looks like, and so on for the other colors. The purple straps 36 are those gripped by the child 14 in FIGS. 2 and 4.

It is at this point in accordance with the practice of the present invention, that adult intervention is required in the setup of the game board 16. At least one group of straps 36, or at the option of the adult, also the other group, are changed in their attachment sites 22–30 to the side 18, and in the exercise of the option and as illustrated in FIG. 3, changes in sites 22–30 to the side 20, the changes of which that are made being readily understood from a comparison of FIGS. 1 and 3.

Following the change in the attachment sites of the straps 36, the child 14 is instructed to select, an instruction effectively communicated and by now understood by the child to be demonstrated by strap end interconnection, the color "purple" and the child it has been observed in practice will often accurately make and demonstrate this selection by a correct strap end interconnection. In the prior art, the task being taught and demonstrated, such as color recognition, was not known to a certainty to be based on recognition, it having not been ruled out that it might have been made on another basis. For example, in this case, the "purple" straps 36 are known by the child to extend from attachment sites 28, 24 as illustrated in FIGS. 1 and 2, and in the subsequent selection any other basis of selection other than color recognition, the task that the child is being taught, must be ruled out. In this case, and contributing to the present invention, the ruling out of any other basis of selection other than color recognition is achieved by the adult intervention of changing the attachment sites as illustrated in FIGS. 3 and 4, wherein the first demonstration of FIG. 2 and the second demonstration of FIG. 4 are likely of color and interconnection means comprehension and not of board locations or attachment sites 22–30 because of the change of the locations/attachment sites between the FIG. 2 and FIG. 4 demonstrations.

To facilitate making the attachment site changes, eyelets 38 are embodied in the strap ends connected by Phillips head screws 32 to the game board 16, and consequently are readily unscrewed and screwed in place.

Interconnection of the free strap ends is achieved using conventional male connectors, individually and collectively designated 40, and female connectors, individually and collectively designated 42, each classification of which is commercially available and of well-known construction and operating mode, the details of which construction and operating mode do not constitute a significant part of this invention nor believed to be necessary for a full understanding thereof. Commercial embodiments of the male connectors 40 and cooperating female connectors 42 are available from the Home Depot at 1608 Sunrise Highway, Freeport, N.Y.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims. For example, although color recognition is the preferred task, it is to be understood that other cognitive features (not shown) can be imprinted on the straps in spaced apart locations, individually and collectively designated 44 as illustrated in FIG. 5 and be the focus of recognition being taught to the child, such as geometric shapes, i.e., circles, triangles or the like, numbers, graphics of objects, i.e., bicycles, animals, and the like, and so on.

What is claimed is:

1. An educational game characterized in providing a demonstration of task achievement comprising:
   A. a game board of rectangular shape;
   B. a first group of at least five straps each of a different selected color and a second group of at least five straps each of a different selected color but of the same different colors of said first group;
   C. first selected operative positions of said first group of said five straps in attached relation at first selected locations along one side of said game board;
   D. first selected operative positions of said second group of said five straps on an opposite side across from said one side of said game board;
   E. five first cooperating interconnecting of means respectively attached to free ends of said straps effective upon interconnection of demonstrating by a user of said game a selection of said two interconnected straps one from said first group of at least five straps and the other from said second group of at least five straps;
   F. second selected locations in replacement of said first selected locations of said first group of at least five straps on said one side of said game board and said second group of at least five straps on said opposite side of said game board; and
   G. subsequent five second cooperating interconnections of said cooperating interconnecting of means respectively attached to free ends of said straps effective upon interconnection of demonstrating by a user of said game a selection of two interconnected straps one from said first group of at least five straps and the other from said second group of at least five straps;

whereby said first and second demonstrations if of the same color demonstrate comprehension of color and not duplication of said first and second board locations.

* * * * *